Aug. 7, 1945.  R. P. ELLIS  2,381,730
BALL BEARING
Filed Feb. 19, 1944
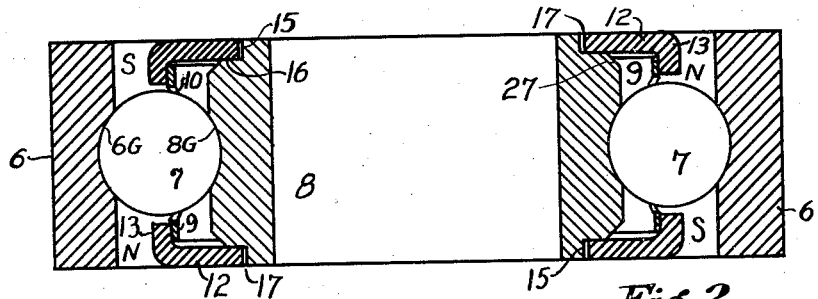
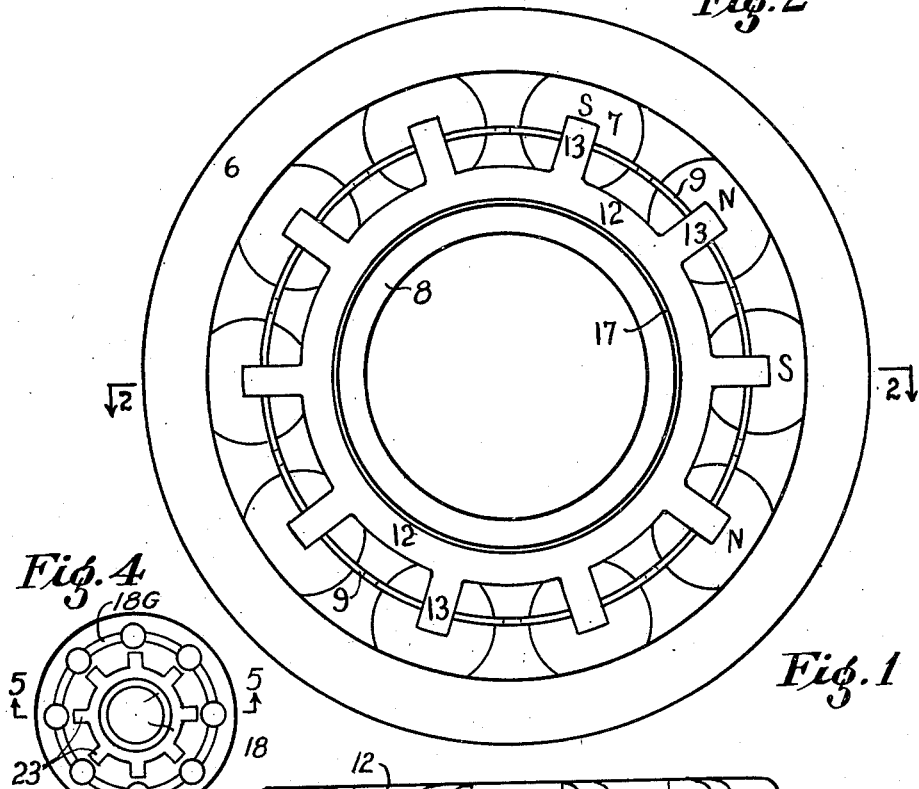
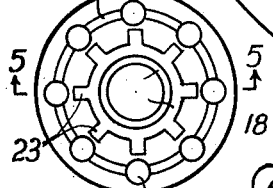
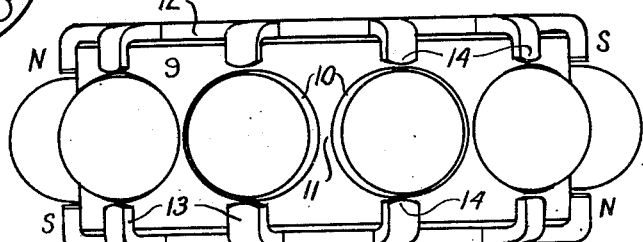
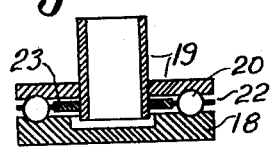
INVENTOR.
Robert P. Ellis.

Patented Aug. 7, 1945

2,381,730

UNITED STATES PATENT OFFICE 2,381,730

BALL BEARING

Robert P. Ellis, Belleville, N. J.

Application February 19, 1944, Serial No. 523,002

17 Claims. (Cl. 308—201)

This invention relates to ball bearings and one of the principal objects of the invention is the provision of a ball bearing which is devoid of sliding friction and therefore has no parts to wear out and requires no lubricant.

A further object of the invention is the provision of a ball bearing in which the balls are kept equally spaced from each other by means of a permanent magnet which rotates around the axis with the balls.

Other and further objects will appear in the specifications and be specifically pointed out in the appended claims, reference being had to the accompanying drawing exemplifying the invention, and in which;

Fig. 1 is a side view of the ball bearing.

Fig. 2 is a cross section on the line 2—2 of Fig. 1.

Fig. 3 shows a bottom view of Fig. 1 with the outer race ring removed.

Fig. 4 shows my invention applied to a thrust bearing.

Fig. 5 is a section on the line 5—5 of Fig. 4.

Referring to the drawing in which like characters and numerals of reference refer to similar parts throughout the several views, the numeral 6 denotes the usual outer race ring of a ball bearing while the numeral 7 indicates the balls and 8 the inner race ring. The balls 7 are confined and caused to run within the grooves 6G and 8G respectively in the usual manner. A spacing ring 9, of non-magnetic material, is located substantially midway between the inner and outer race rings 6 and 8 respectively, this spacing ring 9 being provided with the customary elongated holes 10 by means of which the balls 7 are provided with a predetermined amount of "play" but restrained from contact with the adjoining balls by means of the neck 11 between each pair of holes. In the description so far nothing new has been shown, it being understood however that what follows may also be applied to the many different combinations and designs of both ball and roller bearings.

Ball bearings up to the present time have the defect that the balls necessarily rub against the spacing ring, thus causing friction with loss of energy, heating and requiring a lubricant to minimize these drawbacks. Even with the use of copious lubrication, the spacing ring eventually wears out or the greasy lubricant becomes caked and causes the balls to run out of alinement, in either case causing the bearing to fail with consequent other losses not necessary to enumerate. I avoid all sliding friction by employing a spider-like permanent magnet 12, one on each side of the spacing ring 9, being press fitted to the outer face of the ring as clearly illustrated in Figs. 2 and 3. The permanent magnet spiders 12 are provided with a number of radially extending pole pieces 13, equal in number to the balls 7, the ends of the pole pieces then extending laterally towards the balls 7, each pole piece terminating close to each respective ball 7 so that a strong magnetic attraction exists therebetween. Each pole piece 13 is bluntly tipped at 14 so as not only to better center each ball 7 in its exact predetermined spaced location but also to increase the magnetic tractive effort between each pole piece and ball. Each adjoining pole piece 13 on the magnetic spider 12 is preferably of opposite magnetic polarity and the number of pole pieces as well as the balls should preferably be even, although not necessarily so. In addition, the pole pieces of each opposite spider 12 where they hold a ball between them by magnetic attraction, should preferably be of opposite magnetic polarity, all this being easily accomplished when assembling the ball bearing. The pole pieces of North polarity are indicated by N and the pole pieces of South polarity by the letter S. From the above description it will now be evident that I have designed a rigid three-piece spacing cage, see Fig. 3, which can be press fitted together to close tolerances and which will keep the balls 7 equally spaced at all times by magnetic attraction alone, thus eliminating sliding friction and lubrication. The balls 7 cannot quite contact the pole piece tips 14 due to both the limitations of the raceways 6G and 8G and also to the fact that the pole piece tips 14 do not quite extend up to the edge of the holes 10 in the spacer ring 9.

The inner race ring 8 is provided with an annular recess 15 into which the hole in the magnetic spider 12 rests as will be apparent in Fig. 2. It will be evident that the magnetic spider 12 cannot move parallel to the axis on account of the shoulder 16 but as this is a loose fit and no pressure applied thereto, no friction results. It will also be evident that the magnetic spider disc 12 is free to move a limited distance perpendicular to the axis on account of the space 17 between the recess 15 and the spider 12 but as the magnetic attraction is exerted equally between all the balls 7 and the pole pieces 13 all around the median circumference of the race rings, there can be no contact between the recess 15 and the spider disc 12, and therefor no friction results. In other words, the magnetic spiders 12, together with the spacer ring 9, hang in space by the magnetic attraction between the balls 7 and the pole pieces 13, assuming that the bearing has a horizontal axis. There will then also be no friction between the shoulder 16 and the magnetic spider 12 as even the weight of the spider is removed. Should some severe jar occur so as to temporarily overcome the strong magnetic attraction between a ball 7 and a pole piece 13, the ball 7 would nevertheless remain under magnetic influence of the pole piece on account of the restrictive interference of the neck 11 separating the holes 10 in the spacer ring 9 and thus quickly bringing the ball 7 back to the center of the pole piece tip 14. The magnetic circuit is established from one North pole piece 13 through its associated ball 7 to the opposite South pole piece in the opposite magnetic spider 12, through the inner race ring 8 to the first magnetic spider 12 to original pole piece. An additional magnetic circuit is established from a North pole piece on one magnetic spider through a ball into the outer race ring 6 and back to the adjoining South pole piece on the same magnetic spider. In short, a series of complete magnetic circuits envelop the ball bearing, all of which assist in keeping the balls directly opposite the centers of the pole pieces and none of which magnetic circuits interfere with the operation of the ball bearing. In order to permit the pole pieces 13 to be made longer, which permits greater remanence, I cut off at an angle the portion 27 of the inner race ring 8, this incidentally permitting the width of the magnetic spider disc to be made correspondingly narrower.

From the foregoing description it will thus be evident that the assemblage of balls 7 with their magnetic cage all revolve around the axis without sliding friction, the balls 7 never touching the edges of the holes 10 in the spacing ring 9 as in customary ball bearings, yet causing the spacing ring and magnetic spider to travel around the axis with them.

In Figs. 4 and 5 are illustrated views of a "thrust" ball bearing, merely to show the method of application of my invention thereto, it being understood that they are of the same species. The numeral 18 denotes the bottom bearing, 19 the upper bearing, (which is partly omitted in Fig. 4), 20 the balls, 21 the magnetic spider and 22 the spacing ring, (also not shown in Fig. 4 for the sake of clarity). It will be noted that the magnetic spider 21 is held in space between the bearings 18 and 19 by means of the mutual magnetic attraction between the pole pieces 23 of the magnetic spider 21 and the balls 20 and as the radical magnetic pull is equalized around the axis, there is no friction between it and upper bearing 19. The numeral 18G denotes the groove in which the balls operate in the lower bearing 18. It will thus be evident that a thrust ball bearing in an axial direction has the same advantages as a radial thrust ball bearing, with my invention.

It will of course be understood that the raceways and balls are composed of material capable of conducting magnetism, such as steel. In the appended claims, the mention of ball bearings also includes roller bearings.

Various changes may be made in the embodiment of the invention hereinabove specifically described without departing from or sacrificing the advantages of the invention as described in the appended claims.

I claim:

1. A ball bearing comprising oppositely disposed raceways, balls operating in and between said raceways, and magnetic means for keeping said balls apart in spaced relation.

2. A ball bearing as in claim 1, said magnetic means comprising a magnet permanently magnetized.

3. A ball bearing comprising oppositely disposed raceways, balls operating in and between said raceways, a disc capable of revolving around an axis with said balls, and magnetized pole pieces extending from said disc towards said balls.

4. A ball bearing as in claim 3, said pole pieces being of equal number as said balls and each pole piece terminating with a blunt point in close proximity to its associated ball.

5. A ball bearing comprising oppositely disposed raceways, balls operating in and between said raceways, a pair of oppositely disposed discs capable of revolving around an axis with said balls, and magnetized pole pieces extending from each disc towards said balls.

6. A ball bearing as in claim 5, said pole pieces being of equal number as said balls and the oppositely disposed pole pieces associated with each ball being of opposite magnetic polarity.

7. A ball bearing comprising oppositely disposed raceways, balls operating in and between said raceways, a disc capable of revolving around an axis with one or both of said raceways and said balls, magnetic pole pieces extending from said disc toward said balls, and means for causing said disc to revolve around one of said raceways as a bearing or restraining element.

8. A ball bearing as in claim 7, said raceway being notched or cut so as to form a shoulder to prevent lateral movement of said disc.

9. A ball bearing comprising oppositely disposed raceways, a pair of discs capable of revolving around an axis with one or both of said raceways and said balls, magnetic pole pieces extending from said discs towards said balls and terminating in close proximity thereto, means on one of said raceways for permitting said disc to revolve therearound, said means comprising lateral restraining means but permitting free vertical movement within predetermined limits.

10. A ball bearing comprising oppositely disposed raceways, balls operating in and between said raceways, a disc capable of revolving around an axis with one or both of said raceways and said balls, magnetic pole pieces extending from said disc towards said balls and terminating in close proximity thereto, one of said raceways forming a bearing for said disc to revolve therearound, means on said bearing for restraining said disc against lateral movement, and magnetic means for freely suspending the said disc vertically in space.

11. A ball bearing comprising oppositely disposed raceways, balls operating in and between said raceways, a pair of discs capable of revolving around an axis with one or both of said raceways and said balls, magnetic pole pieces extending from said discs towards said balls and terminating in close proximity thereto, and a non-magnetic spacing ring securing said pair of discs together.

12. A ball bearing as in claim 11, and holes in said spacing ring slightly larger than said balls, said holes being centrally disposed in relation to said pole pieces.

13. A ball bearing comprising oppositely disposed raceways, balls operating in and between said raceways, a disc capable of revolving around an axis with one or both of said raceways and said balls, magnetic pole pieces extending radially from said disc toward said balls and terminating in close proximity thereto, and a non-magnetic ball spacing ring attached to the pole pieces.

14. A ball bearing as in claim 13, said disc with magnetized pole pieces and attached spacing ring being restrained from lateral displacement by its bearing on one of said raceways but being free to move vertically on its bearing within set limits.

15. A ball bearing comprising oppositely disposed raceways, balls operating in and between said raceways, a spacing ring provided with structural means for keeping said balls apart in spaced relation, said structural spacing means permitting a small amount of "play" to said balls in a circumferential direction, and magnetic means revolving with said spacing ring for magnetically attracting each ball towards the center of its respective spacing means.

16. A ball bearing comprising oppositely disposed raceways composed of magnetic material, balls of magnetic material operating in and between said raceways, a revolvable disc of magnetic material on each side of said raceways, and permanently magnetized pole pieces extending from said discs to the close proximity of the opposite sides of each of said balls to form a closed magnetic circuit.

17. A ball bearing as in claim 16, and a non-magnetic spacing ring between said discs and preventing said balls from moving outside of the magnetic attraction of said permanently magnetized pole pieces.

ROBERT P. ELLIS.